(12) United States Patent
Imaseki et al.

(10) Patent No.: US 6,663,993 B2
(45) Date of Patent: Dec. 16, 2003

(54) COOLING DEVICE FOR A FUEL CELL

(75) Inventors: Mitsuharu Imaseki, Wako (JP);
Takeshi Ushio, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 51 days.

(21) Appl. No.: 09/963,816

(22) Filed: Sep. 25, 2001

(65) Prior Publication Data

US 2002/0076591 A1 Jun. 20, 2002

(30) Foreign Application Priority Data

Sep. 25, 2000 (JP) .................... P2000-289907

(51) Int. Cl.[7] .............................................. H01M 8/04
(52) U.S. Cl. ....................................................... 429/26
(58) Field of Search .............................. 429/12, 13, 26

(56) References Cited

U.S. PATENT DOCUMENTS 6,207,308 B1 * 3/2001 Grasso et al. ................. 429/26
6,376,113 B1 * 4/2002 Edlund et al. ................. 429/19
6,416,891 B1 * 7/2002 Condit et al. ................. 429/13

FOREIGN PATENT DOCUMENTS

JP         2001-339807         12/2001

* cited by examiner

Primary Examiner—Susy Tsang-Foster
(74) Attorney, Agent, or Firm—Lahive & Cockfield LLP

(57) ABSTRACT

In a cooling device for a fuel cell, a primary cooling liquid discharged from a heat exchange device 3 is partially flowed to an ion exchange device 15 through a communication passage 11B. A flow rate regulator 14 provided in the communication passage 11B regulates the flow rate of the primary cooling liquid flowed into the ion exchange device 15. Accordingly, even if the electricity demanded to be outputted from the fuel cell increases or decreases, it is possible to manage conductivity in the primary cooling liquid and useless consumption energy can be reduced to a minimum.

3 Claims, 6 Drawing Sheets

COOLING DEVICE FOR A FUEL CELL

BACKGROUND OF THE INVENTION

1. Field of the Invention

The present invention relates to a cooling device for a fuel cell which can suitably cool off.

2. Prior Art

Recently, there has been developed a kind of a battery car equipped with a traction motor in place of an engine.

As one of these battery cars, a development of a fuel cell car which carries a hydrogen ion (or a proton) exchange membrane type fuel cell or proton exchange membrane fuel cell (PEMFC in abbreviation) as the power supply of a traction motor is advanced rapidly. This type of fuel cell will be hereinafter referred to as a PEM type fuel cell.

This PEM type fuel cell is formed or constructed as a stack formed by laminating a number of fuel cells as a power generation unit. Each cell has a structure constituted with a membrane-electrode assembly (MEA) sandwiched between two separators, of which one is an anode side separator having a hydrogen supply channel and the other is a cathode side separator having an oxygen supply channel.

Hereupon, as for the MEA, the anode side electrode catalyst layer and the gas diffusion layer are laminated successively on one side of the proton exchange membrane, and the cathode side electrode catalyst layer and the gas diffusion layer are laminated successively on the other side of the proton exchange membrane.

In the fuel cell car carrying a fuel cell of the PEM or other type, a cooling device to maintain temperature in the fuel cell within a certain appropriate range is provided.

As for the cooling device, there is a reference, in Japanese patent application No. 2000-155619filed in the name of the assignee of the present application, to the use of the cooling device for preventing a liquid junction phenomenon from occurring in a fuel cell. An outline of constitution of this cooling device is shown in FIG. 6.

This cooling device 50 is formed with a primary circulating passage 51 for a primary cooling system and a secondary circulating passage 52 for a secondary cooling system, through which a primary cooling liquid and a secondary cooling liquid are respectively circulated. The primary cooling liquid cools the fuel cell FC; the primary cooling liquid that is warmed accordingly is cooled by the secondary cooling liquid in a heat exchanger 58 where both the primary and the secondary cooling passages pass through.

The primary circulating passage 51 is provided with, first, a primary circulating pump 53 by which an insulating primary cooling liquid is pumped to be passed through the primary circulating passage 51, and second, a heat regulator 54 which is, for example, composed of a thermostat. An ion exchange device 55 also is provided in the primary circulating passage 51 in order to remove various ions, such as metal ions or the like contained in the primary cooling liquid.

The secondary circulating passage 52 is provided with a secondary circulating pump 56 by which a secondary cooling liquid is pumped to be passed through the secondary circulating passage 52. A radiator 57 cools the secondary cooling liquid.

In this cooling device 50, the primary cooling liquid is directly supplied to an electrode of the fuel cell FC.

Accordingly, when there exist various ions such as metal ions in the primary cooling liquid, the electric insulation activity thereof is deteriorated, due to the conductivity thereof being raised remarkably.

In order to prevent the electric insulation activity of the primary cooling liquid from deteriorating, the cooling device 50 is provided with an ion exchange device 55 in the primary circulation passage 51, to remove various ions existing in the primary cooling liquid.

However, as for passing the primary liquid through the ion exchange device 55, because the internal pressure or resistance therefor is big, it is not appropriate to pass the whole of the primary cooling liquid through both the fuel cell and the ion exchange device 55 as in series.

Accordingly, the ion exchange device 55 was arranged in parallel to the fuel cell FC and separated one part of whole of the first cooling liquid was passed in the ion exchange device 55.

Hereupon, it is necessary for the primary cooling liquid to be let flow more than one fixed quantity thereof through the ion exchange device 55 in order to manage the electric conductivity of the primary cooling liquid in conventional cooling device for the fuel cell 50 mentioned above.

However, when the fuel cell FC is used as a power supply of a car, because the electric power demanded for the fuel cell is changed in various ways by large range according to each running state thereof or the like, a flow rate of the primary cooling liquid is also let be changed according to a change of electric power demanded for this fuel cell FC. Namely, the flow rate of the primary cooling liquid is allowed to increase, when the demand electricity for the fuel cell FC increases, because the fuel cell FC must be cooled all the much.

In contrast, the flow rate thereof is allowed to decrease, when the demand electricity for the fuel cell FC decreases.

Hereupon, in conventional device 50 as described above, the increase or the decrease of the flow rate of the primary cooling liquid is to be adjusted by the pressure applied by the primary circulating pump 53.

Besides, the quantity of the primary cooling liquid supplied in the ion exchange device 55 also depends on the pressure applied by the primary circulation pump 58.

Therefore, when the demand electricity for the fuel cell FC is small, because the pressure applied by the primary circulation pump 53 is also let become small, the flow rate of the primary cooling liquid in the ion exchange device 55 becomes small.

Accordingly, when the electric power demanded for the fuel cell is small, there may be the case that sufficient flow quantity cannot be secured in the ion exchange device 55 to measure and control the electric conductivity of the primary cooling liquid.

In order to solve the problem, it is good if the primary circulation liquid of necessary quantity to measure the electric conductivity is supplied or secured in the ion exchange device 55 by virtue of a certain method when the electric power demanded for the fuel cell is small.

However, when the demand electricity for the fuel cell is large, the primary circulation liquid more than needed is supplied in the ion exchange device by using this method, and thus the energy to drive the primary circulation pump 53 is wasted.

Consequently, it is an object of this invention to provide a cooling device for a fuel cell in which, even if the demanded electricity for the fuel cell is increased or decreased, and the flow rate of the primary cooling liquid supplied in the fuel cell is increased or decreasing, it is possible to have the electric conductivity controlled in the primary cooling liquid and the useless consumption of energy is reduced to the utmost as far as it can be.

SUMMARY OF THE INVENTION

The present invention is directed to address the above-described disadvantages, and there is provided a cooling device for the fuel cell in which a cooling liquid is circulated and supplied to the fuel cell for cooling the same, which cooling device comprises: a circulating pump, through which the cooling liquid circulates: a heat exchanger, in which the cooling liquid is circulated from the fuel cell is cooled; and ion exchange device or container made of ion exchanging resin, through which ions are removed from the cooling liquid; and a flow rate adjustment device that maintains a constant flow rate of the cooling liquid flowing into the ion exchange device.

In this invention, because there is the flow rate adjustment means arranged, through which the flow rate of the primary cooling liquid flowed through the ion exchange device is maintained constant, the flow rate thereof through the ion exchange device can be adjusted in a suitable constant range of all flow rates of the primary cooling liquid originated in the primary circulating pump.

Therefore, because the pressure applied by the primary circulating pump does not have to be configured in accordance with the value obtained when the flow rate of the primary circulating liquid exhibits the smallest value, useless energy consumption can be reduced.

DESCRIPTION OF THE PREFERRED EMBODIMENT

Figure 1:
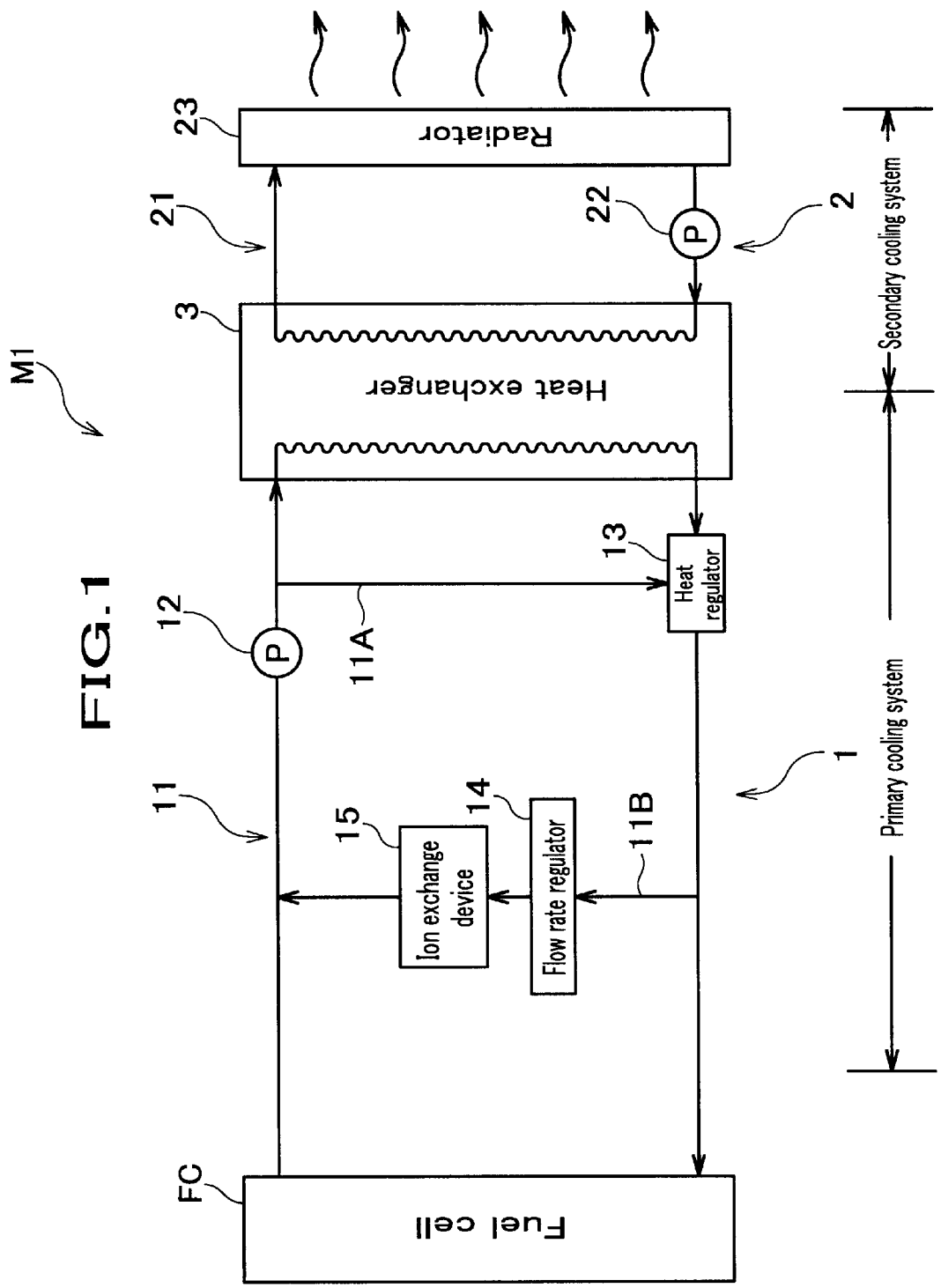
FIG. 1 is a circuit constitution view of the cooling device of a fuel cell car concerned with the first embodiment of this invention.
Figure 2:
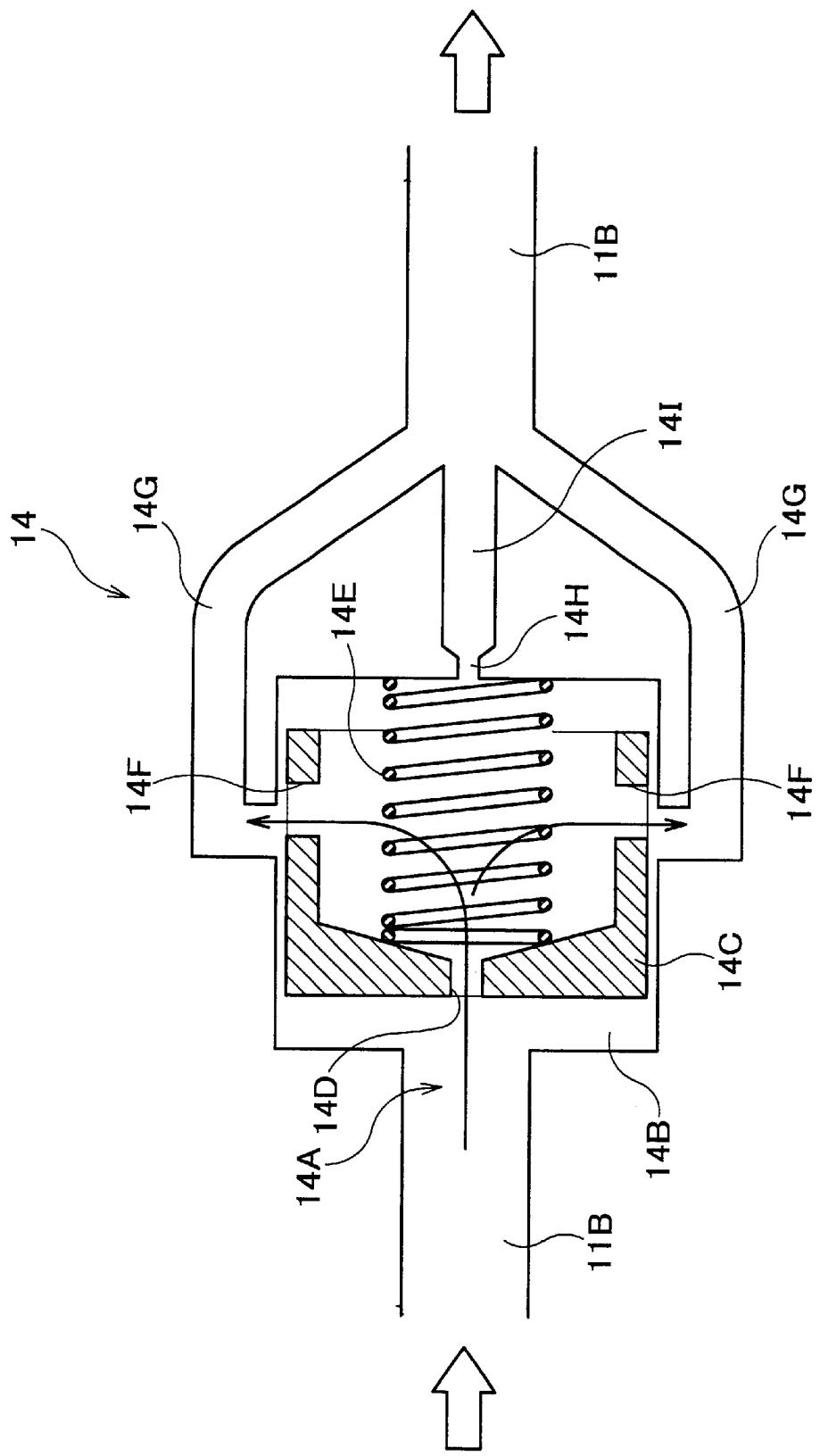
FIG. 2 is a cross sectional view showing the flow rate regulator of this invention.
Figure 3:
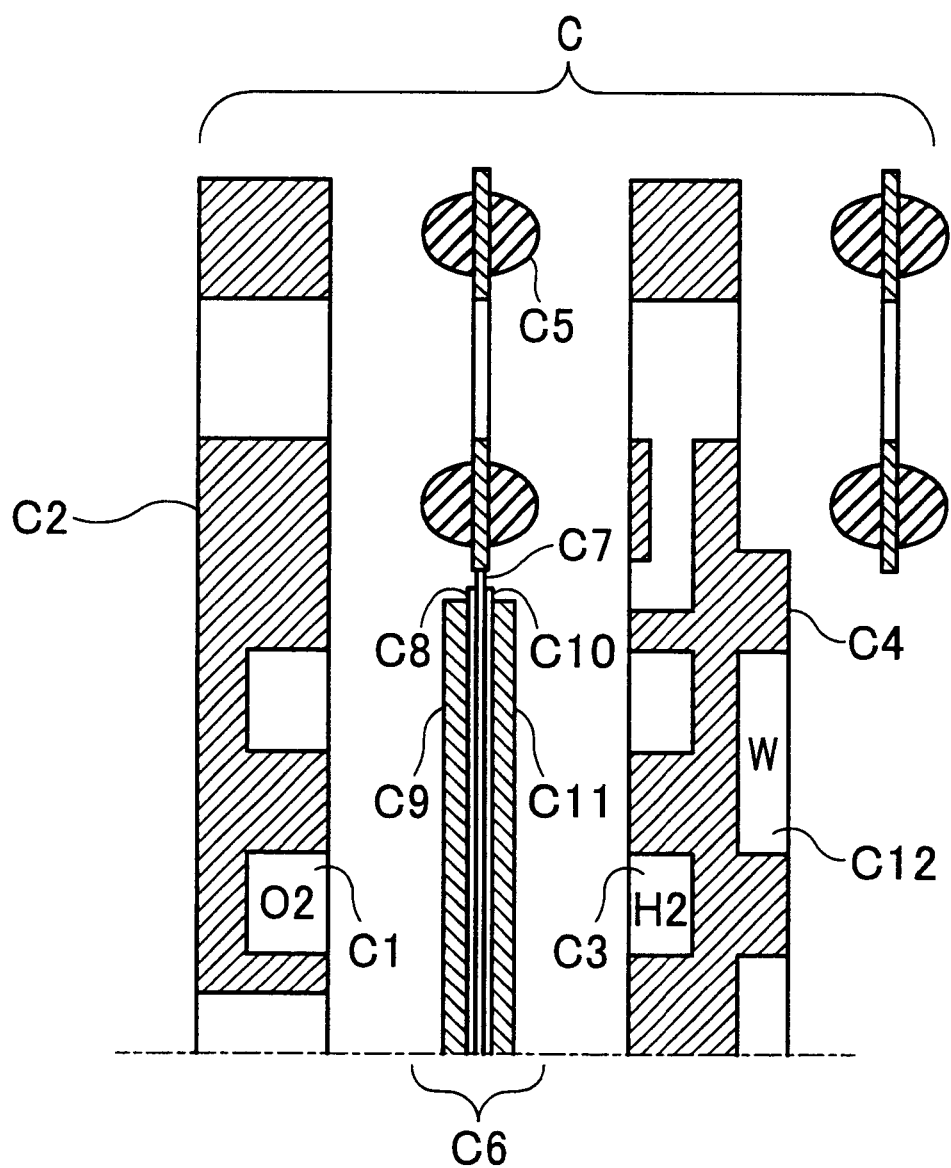
FIG. 3 is a local sectional view showing the cell structure of the fuel cell shown in FIG. 1.

This invention will be described concretely in further detail with reference to the accompanying drawings. FIG. 1 is a constitution view of the cooling device for a fuel cell according to the first embodiment of the present invention. FIG. 2 is a cross sectional view showing the flow rate regulator of this invention. FIG. 3 is a local sectional view showing the cell structure of the fuel cell shown in FIG. 1.

As shown in FIG. 1, the cooling device M1 for a fuel cell according to this embodiment has a primary cooling system 1, through which the primary cooling to cool fuel cell FC circulates, and a secondary cooling system 2 as well. These primary and secondary cooling systems are connected with each other through a heat exchanger 8.

In the primary cooling system 1, the primary circulation passage 11 is formed. The primary circulation passage 11, which comprises the primary circulation pump 12 to cycle the primary cooling liquid in the primary circulation passage 11 and a thermostat which for example includes a three way valve, is provided with the heat regulator 13.

Besides, the primary circulation passage 11 is provided with the flow rate of quantity regulator 14 as a flow rate adjustment means, through which the primary cooling liquid is let flow therein with a constant flow rate maintained, and the ion exchange device 15 that contains the ion-exchange resin, which removes various kinds of ions, such as metal ions, contained by the primary cooling liquid.

The primary cooling passage 11 constitutes a circulation passage, through which the primary cooling liquid forced by the primary circulation pump 12 to pass through the heat exchanger 3 and a cooling liquid channel C12 (FIG. 3) of the fuel cell (FC), and comes back to the primary circulation pump 12.

A heat regulator 13 is provided between the heat exchanger 3 and the cooling liquid channel C12 of the fuel cell FC, and are connected with each other through the flow passage.

At the heat regulator 13 is provided a bypass passage 11A in parallel with the heat exchanger 3. The cooling liquid originated in the primary circulation pump 12 flows toward the heat exchanger 3 and separating in two ways at the starting point of the bypass passage: one to the heat exchanger 3, and the other to the heat regulator 13.

The heat regulator 13 is composed of the well-known thermostat, and includes a member expansive by heat, in which both the primary cooling liquid warmed in the fuel cell and the primary cooling liquid cooled in the heat exchanger 3 flow respectively through the bypass passage 11A or from the heat exchanger 3.

Through this expansive member of the heat regulator 13, the inflow ratio of the warmed liquid to the cooled liquid, which flow therein is changed or adjusted, by changing the cross-section area that corresponds to each flow rate.

Consequently, the primary cooling liquid of which the temperature is adjusted at around 70° C. is flowed out in the primary circulation passage.

When the electricity demanded to be outputted from the fuel cell increases, because it is necessary to cool the fuel cell FC more, the primary cooling liquid is required to circulate more therein.

On the contrary, when the electricity demanded to be output from the fuel cell decreases, because the fuel cell FC may be cooled less, the first cooling liquid to be circulated with the first circulation pump 12 is decreased.

In this way, the flow quantity of the first cooling liquid to cycle with the first circulation pump 12 is controlled according to the quantity of the electricity demanded to be output from the fuel cell FC.

Besides, the primary circulating passage 11 is also provided with a communication passage 11B, which is connected with a point of passage between the primary circulation pump 12 and the fuel cell FC and is parallel with the bypass passage 11A.

The communication passage 11B is provided with a flow rate regulator 14 and the ion exchange device 15 arranged in this order from the upper stream.

The flow rate regulator 14, as shown in FIG. 2, is provided with an inflow port 14A connected to the communication passage 11B.

The inflow port 14A is connected to a space part 14B, in which is formed a sleeve valve 14C that can move in the flow direction of the primary cooling liquid. A movable orifice 14D is formed at the most upper part in the movable range of the sleeve valve 14C.

Moreover, inside the sleeve valve 14C is formed a recess, which is provided with a spring 14E that presses the sleeve valve 14C toward the inflow port 14A.

Furthermore, formed on the both flank of the sleeve valve 14C are flow exits 14F by which when the sleeve valve 14C gets closer to the inflow port 14A most, the space part 14B communicates with an outflow passages 14G perfectly. The outflow passages 14G communicates with the down stream side of the communication passage 11B.

Besides, an orifice for diminishing pressure 14H is formed in the most down stream location of the space part 11B, and communicates with an outflow port 14I, that also communicates with the communication passage 11B.

At this point, as for the flow rate regulator 14, in which when the primary cooling liquid drained from the heat exchanger 3 (shown in FIG. 1) passes through the inflow port 14A and flows into the space part 14B, the sleeve valve 14C is let move and the opening area of the flow exit 14F through which the cooling liquid can flow to the outflow passages 14G is adjusted, so that the pressure difference at the point between before and after the regulator may be constant, namely that the flow rate difference thereat may be constant.

To be concrete, when the liquid pressure of the primary cooling liquid is smaller than the pressure given by the spring 14E, the sleeve valve 14C is located in the upper side of the stream, so that each opening area formed in the common opening part between the flow exits 14F and the outflow passages 14G is adjusted to be large.

Accordingly, a relatively large quality of the primary cooling liquid flows through the flow exit 14F.

On the contrary, when the liquid pressure of the primary cooling liquid is larger than the pressure given by the spring 14E, the sleeve valve 14C moves to the down stream side.

With the movement to the down stream side of the sleeve valve 14C, each opening area formed between the flow exits 14F and the outflow passages 14G becomes small.

In this way, it is possible to maintain the flow rate of the primary cooling liquid that passes through the communication passage 11B, because the opening area formed at each place between the flow exits 14F and the outflow passages 14G is adjusted, with the change of liquid pressure of the primary cooling liquid.

The orifice for diminishing pressure 14H is formed for the purpose of preventing the flow rare regulator 14 from being damaged, because the space part 14B suffers from the surplus liquid pressure when the sleeve valve 14C moves in side of most down stream and the flow passage is intercepted completely at each place of the flow exits 14F and the outflow passages 14G respectively.

Accordingly, the diameter of the orifice for diminishing pressure 14H is formed much smaller than that of the movable orifice 14D.

In the flow rate regulator 14 as described above, the flow rate of the primary cooling liquid supplied to the ion exchange device 15 is regulated to be a constant predetermined value. In other words, the flow rate of the primary cooling liquid passing through the communication passage 14B, to which a part of the primary cooling liquid flowed via the heat regulator 13 is supplied, is also regulated to be constant.

The ion exchange device 15 is provided with ion exchange resins (not shown), with which the primary cooling liquid is contacted, and by which various kinds of ions such as metal ions dissolved in the primary cooling liquid are adsorbed and removed.

The primary circulation passage 11 that includes the bypass passage 11A and the communication passage 11B is accommodated in a fuel cell box (not shown), together with the heat exchanger 3.

The heat exchanger 3 is arranged in a neighborhood of the fuel cell FC, and, accordingly, the length of duct line of the primary circulation passage 11 is shortened.

The primary circulation passage 11, as thus shortened is constituted of materials that are suitable enough to prevent the liquid junction phenomenon from occurring in the fuel cell FC.

The materials used are preferably hard to elute ions therefrom, such as, an insulator such as a glass coated stainless steel pipe, a synthetic resin pipe or the like.

Moreover, the insulation refrigerant is used as the primary cooling liquid in order to prevent the liquid junction phenomenon from occurring in the fuel cell FC.

As for the insulation refrigerant, it is desirable to use a pure water having low conductivity, or a mixed liquid of the pure water as mentioned above and ethylene glycol series, but it is possible to use insulating oil.

On the other hand, a secondary circulation passage 21 is formed in a secondary cooling system 2.

The secondary circulation passage 21 includes a radiator 23 to aircool a secondary cooling liquid and a secondary circulation pump 22 to cycle the second cooling liquid in the circulation passage 21.

The second circulation passage 21 is so designed that the secondary cooling liquid pumped by the secondary circulation pump 22 passes through the heat exchanger 3 and a radiator 23 and comes back to the secondary circulation pump 22.

Besides, the radiator 23 is an air cooling type heat dissipating device that includes an electric cooling fan (not shown).

Furthermore, the secondary circulation passage 21 is constituted of the same materials as described in the primary cooling passage 11, that is hard to elute ions therefrom in order to prevent the liquid junction phenomenon from appearing in the fuel cell FC.

As the materials mentioned above, for example, an insulator such as a glass coated stainless steep pipe, a synthetic resin pipe or the like can by employed.

As for the secondary cooling liquid, the insulation refrigerant of a pure water mentioned above or a mixed liquid of a pure water and ethylene glycol line is used in order to prevent the liquid junction phenomena from occurring in the fuel cell FC, as the first cooling liquid.

Besides, the secondary cooling system 2 not only cools the primary cooling system 1 but also the other members in the fuel cell car that the fuel cell is carried in.

For example, heating sources which include a traction motor, a drive motor for supercharger, a drive unit and a control unit or the like are cooled by cycling the secondary cooling liquid therein.

The secondary cooling liquid that has cooled these devices and has thus been warmed is cooled in the radiator 23.

More, hereupon, a temperature of the primary cooling liquid in the primary cooling system 1 is regulated to be at around 70° C., so that the fuel cell FC is controlled to be maintained in an appropriate temperature range of 75° C.–85° C.

On the other hand, the temperature of the secondary cooling liquid 2 is maintained at around 75° C. at the place between the exit side of the heat exchanger 3 and the entrance side of the radiator 23, and at around 65° C. at the place between the exit side of the radiator 23 and the entrance side of the heat exchanger 3.

Besides, the fuel cell FC, it is the PEM type fuel cell, in which a lot of cells a generation unit are laminated, and the most stable output state can be obtained in temperature environment of 75° C.–85° C.

Hereupon, as shown in FIG. 3, each cell constituting the fuel cell FC has the structure that a membrane/electrode assembly (MEA) C6 which has a seal C5 put between a cathode side separator C2 having an oxygen supply passage C1 in its inside and a anode side separator C4 having a hydrogen supply passage C3 in its inside.

In the membrane/electrode assembly C6, a cathode side electrode catalyst layer C8 and a gas diffusion layer C9 are laminated successively on one side of a hydrogen ion exchange membrane C7, and an anode side electrode catalyst layer C10 and a gas diffusion layer C11 are laminated successively on the other side thereof.

At the outside of the anode side separator C4, a cooling liquid pass C12 is formed.

As mentioned above, in the cooling device for the fuel cell according to this embodiment, the primary and the secondary circulation pumps (12or22) are provided, by which respectively, the primary or the secondary cooling liquid is let cycle in the primary or the secondary circulating passage (11 or 12).

Hereupon, in case that the fuel cell is in cold state, wherein the primary cooling liquid passed through the heat regulator 13 of the primary circulating passage 11 is low in temperature, because the primary circulation passage 11 in the heat regulator is cut at the point of exit side of the heat exchanger 3, and thus the primary cooling liquid circulates from the primary circulating pump 12, through the bypass passage 11A, the heat regulator 13 and the cooling liquid pass C12, and comes back to the primary circulation passage 12.

The primary cooling liquid circulated through the primary circulation passage without passing the heat exchanger 3 is warmed gradually in each stage of passing through the cooling liquid pass C12 of the fuel cell FC, causing the fuel cell FC to warm up.

When the temperature of the primary cooling liquid passing through the heat regulator 13 of the primary circulation passage 11 is raised, and the warming up of the fuel cell FC is completed, the heat regulator 13 controls an inflow ratio of the primary cooling liquid to flow from the bypass passage 11A versus to flow from the heat exchanger 3, so that the mixture thereof may be adjusted in temperature of 70° C.

The primary cooling liquid adjusted in this way passes through the cooling liquid pass C12 of the fuel cell FC and takes in the heat thereof during the process and cools the fuel cell FC so much.

Then, the primary cooling liquid having cooled the fuel cell FC is cooled once again in the heat exchanger 3, because a heat exchange progresses between the primary cooling liquid thereof and the secondary cooling liquid of the secondary circulation passage.

On the other hand, the secondary cooling liquid passes through the heat exchanger 3 from the secondary circulation pump 22 in the secondary circulation passage 21, and flows into a radiator 23, then flows out of the radiator 23 and circulates to the second circulation pump 22.

The secondary cooling liquid flowed into the heat exchanger 3 absorbs heat of the primary cooling liquid of the primary circulating passage 11 and radiates heat in the air with blast of the radiator.

As controlled in this way, the temperature of second cooling liquid is, as stated above, maintained at around 75° C. at entrance side of the radiator 23, and it is maintained at around 65° C. at the exit side of the radiator 23.

Besides, in the primary circulation passage 11, part of the primary cooling liquid that cooled off in the heat exchange device 3 is controlled to be supplied into the ion exchange device 15 through the communication passage 11B.

At this point, it is controlled that the flow rate of the primary cooling liquid in the communication passage 11B becomes constant through the flow rate regulator 14, namely the primary cooling liquid flowed into the communication passage 11B also is adjusted to a constant value in the flow rate.

On this account, the flow rate of the primary cooling liquid in the ion exchange device 15 becomes constant at a certain value, even if the output of the fuel cell FC becomes big, and the flow rate of the primary cooling liquid flown through the primary circulating passage 11 becomes large due to enhancement of the pressure demanded for the primary circulating pump 12.

In the same matter, even if the output of the fuel cell FC because small, and the flow rate of the primary cooling liquid flowed through the primary circulating passage 11 becomes small due to the small pressure demanded for the primary circulation pump 12, the flow rate of the primary cooling liquid in the ion exchange device 15 is maintained constant.

Accordingly, the useless consumption energy can be reduced, because it is not necessary to set a required pressure of the primary circulation pump 12 at a fixed value that is obtained when the flow rate of the primary circulation liquid is small.

Hereupon, a relation between the flow rate of the primary cooling liquid flowing through the ion exchange device 15 and the output of the fuel cell FC will be described with reference to FIGS. 4A and B.

Figure 4A:
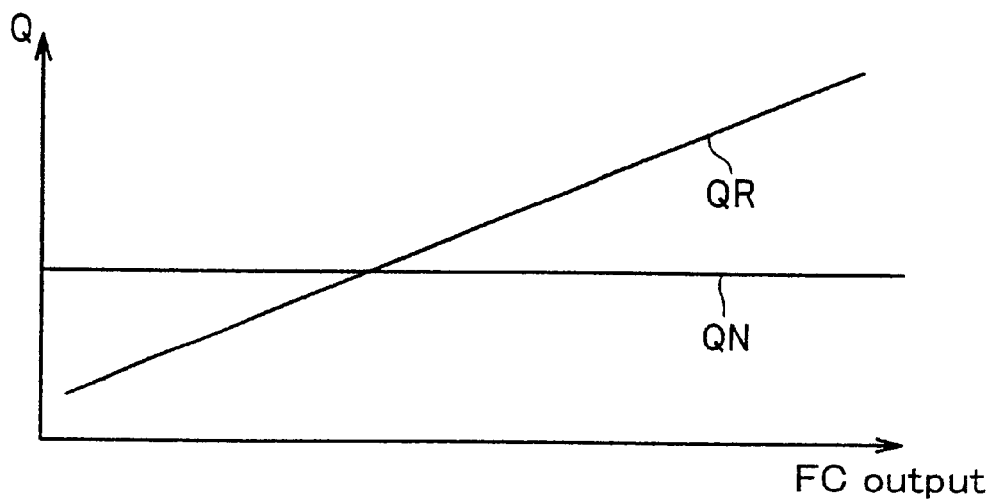
FIG. 4A is a graph showing the relation between power of a fuel cell and a flow rate of the primary cooling liquid passing through the ion exchange device of conventional cooling device for a fuel cell.

As for the fuel cell FC and the ion exchange device 55, each of which is concerned with an existing cooling device for the fuel cell FC, the relation between the output of the former and the flow rate of the primary cooling liquid flowed in the latter is shown in FIG. 4A.

Pressure pumped in the first circulation pump 53 depends on the electricity output of the fuel cell.

In other words, when the output demanded for the fuel cell FC increases, because the fuel cell needs to be cooled more, the primary cooling liquid needs to be passed through the same.

In contrast, when the output demanded for the fuel cell FC decreases, because the fuel cell is to be cooled a little, it is good for small quantity of the primary cooling liquid to pass through the fuel cell FC.

On this account, the flow rate QR of the first cooling liquid flowing through the ion exchange device 55 is almost in proportion to the output of the fuel cell FC.

In the ion exchange device 55, the flow rate QN, for which it is necessary to manage conductivity of the primary cooling liquid is almost fixed independently of output of the fuel cell FC.

Accordingly, in the conventional cooling device 50, the flow rate of the primary cooling liquid to pass through the ion exchange device 55 falls in a preferable range within some limited range of the output of the fuel cell FC, but the flow rate of the primary cooling liquid passing through the ion exchange device 55 may become short or excessive in the most part of the output range of the fuel cell FC.

Figure 4B:
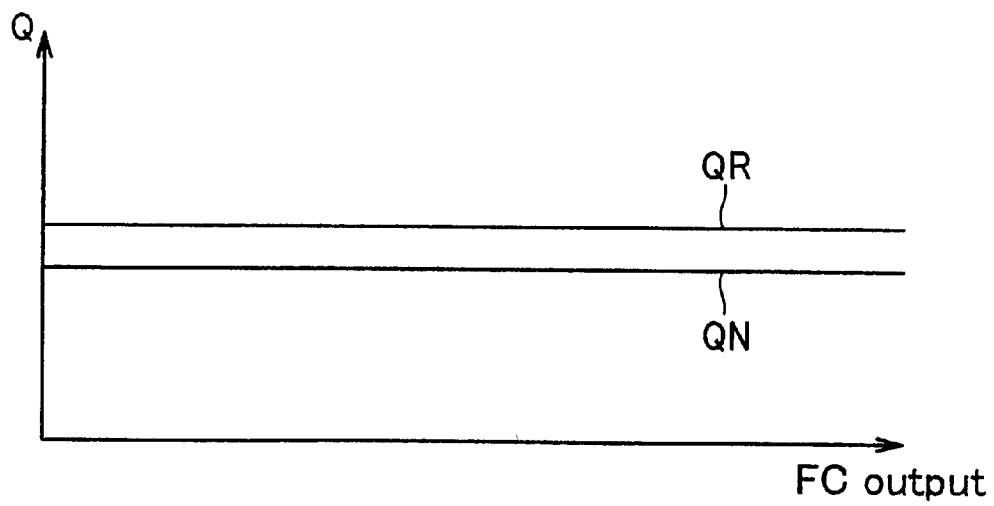
FIG. 4B is a graph showing the relation between power of a fuel cell and a flow rate of the primary cooling liquid passing through the ion exchange device of the cooling device for a fuel cell according to this invention.

Because the flow rate regulator 14 is arranged within the cooling device M1 according to the present invention for this, as show in FIG. 4B the flow rate QR of the primary cooling liquid to pass through the ion exchange device 15 can be maintained almost constant.

On this account, the flow rate of the primary cooling liquid in the ion exchange device 15 can be prevented from becoming excessive or short. Besides, in the condition that the flow rate QR of the first cooling liquid in the ion exchange device 15 is a little more than the flow rate QN needed for managing conductivity of the primary cooling liquid, the conductivity of the primary cooling liquid can be managed adequately.

Another embodiment of the present invention will be described referring to FIG. 5.

Because the cooling device M2 according to this embodiment compared with the first embodiment mentioned above as shown in FIG. 5 and is different in only the primary cooling system 1, it is noted that there are same number used for the fuel cell FC, the secondary cooling system 2 and the heat exchange device 3 and the same explanation will be omitted.

Figure 5:
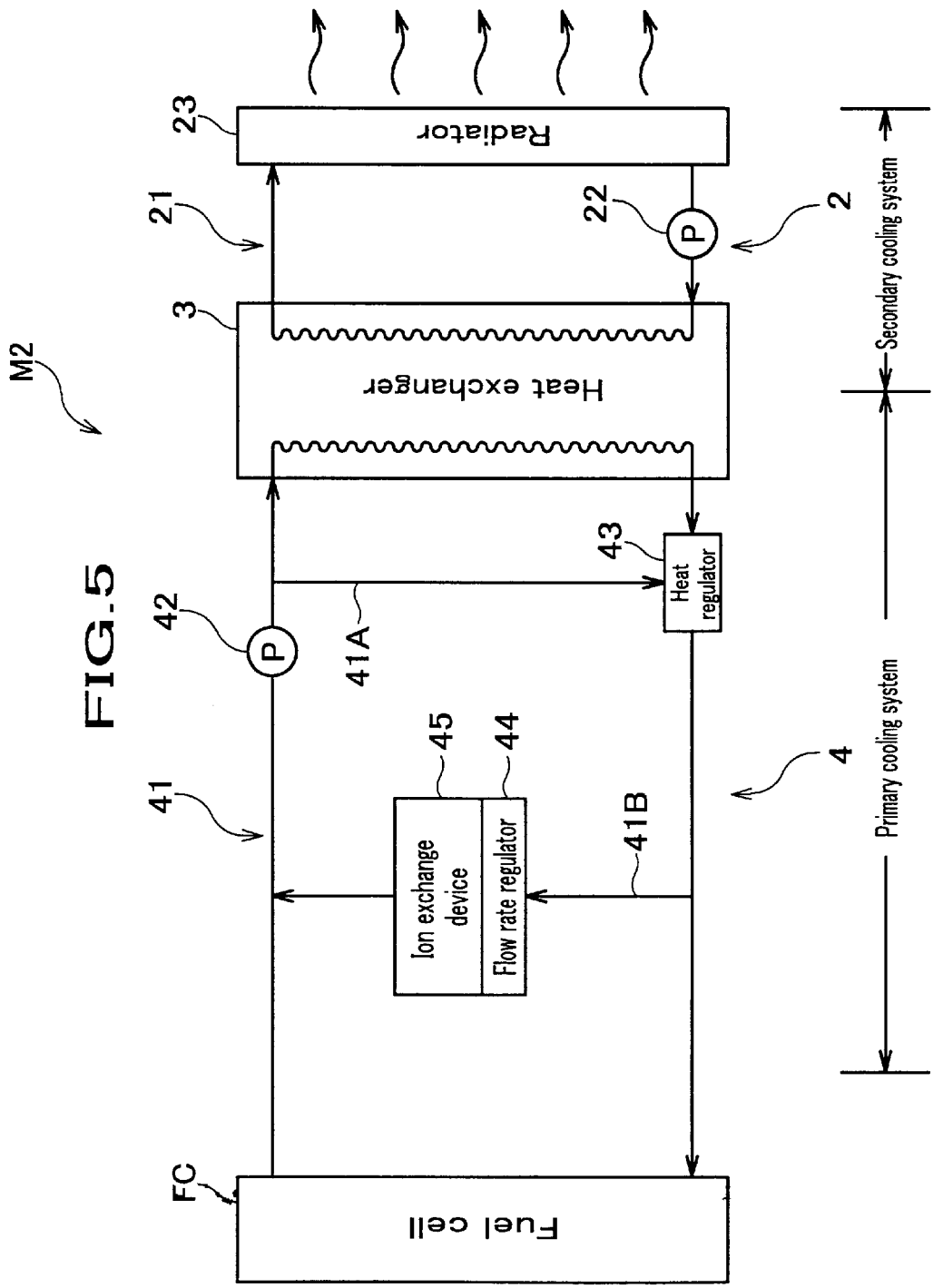
FIG. 5 is a circuit constitution view of the cooling device of the fuel cell car concerned with the second embodiment of this invention.
Figure 6:
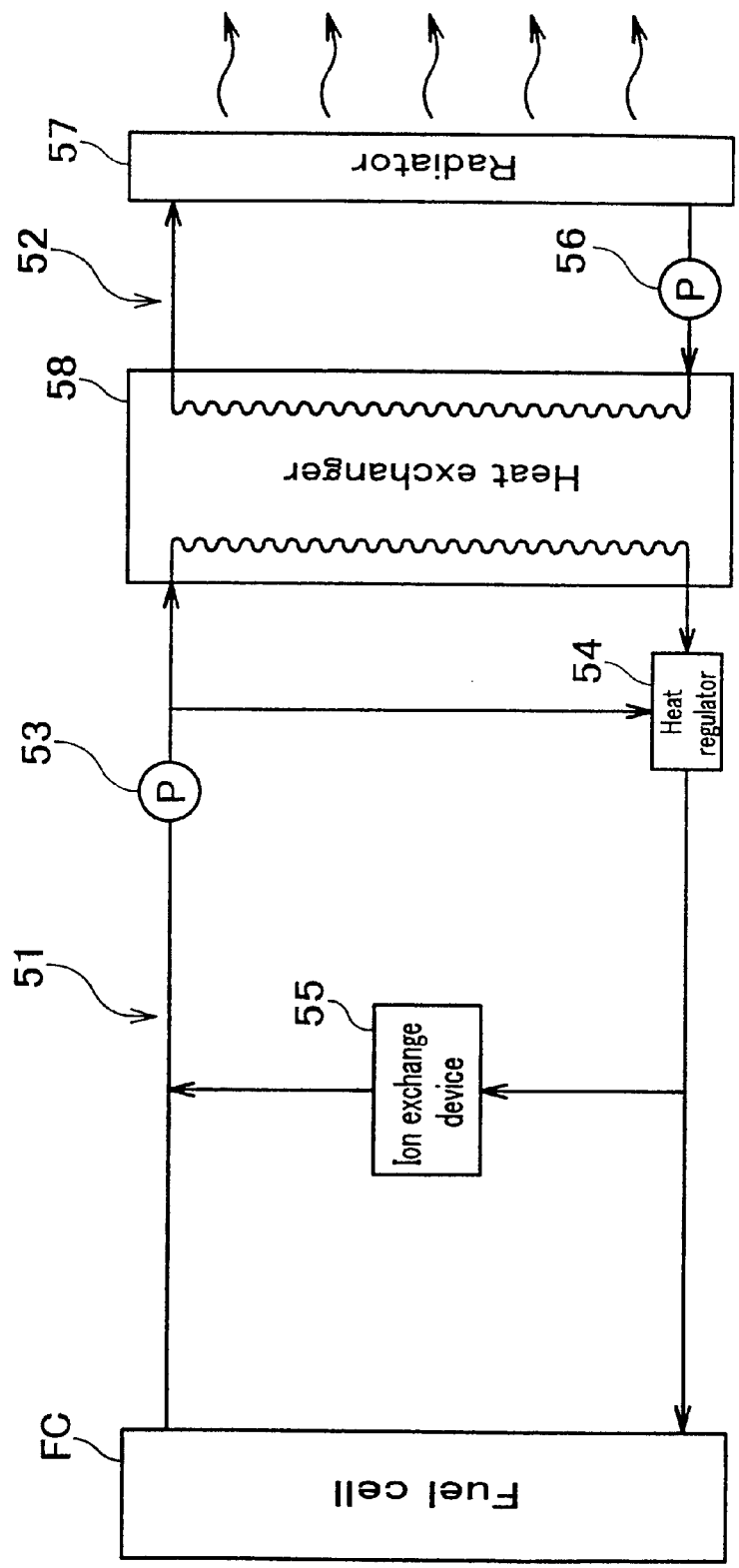
FIG. 6 is a circuit constitution view of the cooling device of the fuel cell concerned with prior art.

Denoted by 41A and 41B in FIG. 5 are respectively a bypass passage and a communication passage, each corresponding to the components 11A and 11B of FIG. 1. Since these corresponding components have the same structure and function, a duplicate description will not be given hereafter.

The primary cooling device M2 according to this embodiment has the primary cooling system 4, in which the primary circulation passage 41 is formed.

The primary circulation passage 41 includes the primary circulation pump 42 to cycle the first cooling liquid in the circulation passage 41 and the heat regulator 43 which is for example, made of thermostat and can adjust temperature of the primary cooling liquid.

The primary circulation passage 41 is provided with the flow rate regulator 44, i.e. the flow rate adjustment means, to adjust the flow rate at a constant value. The passage 41 also includes the ion exchange device 45 that uses the ion exchange resin to remove various ions of metal ions contained in the primary cooling liquid.

Moreover, the flow rate regulator 44 and the ion exchange device 45 are formed in one united body.

The cooling device M2 is expected to be miniaturized to the utmost, so that it may be accommodated in limited space of the fuel cell box.

Accordingly, from this standpoint, this embodiment that allows the cooling device M2 to be formed in one integral body is very useful.

The preferred embodiments according to the present invention have been described above, but this invention is not limited to the embodiments mentioned above.

For example, as the flow rate adjustment means, it is not necessary not to use the flow rate regulator shown by the first embodiment mentioned above and it is possible to utilize the flow rate control means known in the art, instead.

Consequently, as for the present invention, there is formed the flow rate regulator in the cooling passage, through which the cooling liquid pass to the ion exchange device of the fuel cell.

Accordingly, even if the flow rate of the cooling liquid which pass to the fuel cell is changed, due to no change of the flow rate thereof passed to the ion exchange device, it is possible to perform the ion exchange in stability.

What is claimed is:

1. A cooling device for a fuel cell in which a cooling liquid is circulated and supplied to said fuel cell for cooling the same, the cooling device comprising:

a circulating pump, through which said cooling liquid circulates;

a heat exchanger, in which the cooling liquid circulated from said fuel cell is cooled;

an ion exchange device made of ion exchanging resin through which ions are removed from said cooling liquid;

a flow rate adjustment device in which a constant flow rate of the cooling liquid flowing into the ion exchange device is maintained.

2. A cooling device for a fuel cell according to claim 1, wherein said ion exchange device and said flow rate adjustment device are formed in one combined body.

3. A cooling device for a fuel cell according to claim 1, wherein a flow rate of the cooling liquid circulated by said circulating pump is controlled according to generated output of the fuel cell.

* * * * *